(12) United States Patent
Katz et al.

(10) Patent No.: US 10,757,467 B1
(45) Date of Patent: Aug. 25, 2020

(54) SYSTEM AND METHOD FOR SYNCHRONIZED PLAYBACK OF DOWNLOADED STREAMS

(71) Applicant: Playlist Media, Inc., San Francisco, CA (US)

(72) Inventors: Karen Marie Katz, Portola Valley, CA (US); Aline Mary Pereira Pinto da Fonseca, Los Angeles, CA (US); Eduardo Brasao da Fonseca, Los Angeles, CA (US); Robert Craig Davidorf, San Francisco, CA (US); Steve Petersen, Los Gatos, CA (US)

(73) Assignee: Playlist Media, Inc., San Francisco, CA (US)

( * ) Notice: Subject to any disclaimer, the term of this patent is extended or adjusted under 35 U.S.C. 154(b) by 0 days.

(21) Appl. No.: 15/589,867

(22) Filed: May 8, 2017

Related U.S. Application Data

(60) Provisional application No. 62/333,457, filed on May 9, 2016.

(51) Int. Cl.
   *G06F 15/16* (2006.01)
   *H04L 29/06* (2006.01)
   (Continued)

(52) U.S. Cl.
   CPC ....... *H04N 21/4305* (2013.01); *G11B 27/002* (2013.01); *G11B 27/10* (2013.01); *H04N 21/4126* (2013.01); *H04N 21/41407* (2013.01); *H04N 21/4307* (2013.01); *H04N 21/6181* (2013.01)

(58) Field of Classification Search
   CPC ......... H04L 29/06027; H04L 29/06462; H04L 29/06; H04L 29/06523; H04L 29/08072; H04L 29/0854; H04L 29/0809; G06F 1/14
   See application file for complete search history.

(56) References Cited

U.S. PATENT DOCUMENTS

| 7,937,671 | B2 * | 5/2011 | Liebhold | G11B 27/034 |
| | | | | 715/828 |
| 2003/0225834 | A1 * | 12/2003 | Lee | G06Q 10/107 |
| | | | | 709/204 |

(Continued)

OTHER PUBLICATIONS

USPTO; Non-Final Office Action for U.S. Appl. No. 15/589,878 dated Apr. 5, 2019, 9 pages.

*Primary Examiner* — Abdullahi E Salad
(74) *Attorney, Agent, or Firm* — NK Patent Law

(57) ABSTRACT

A system for synchronized streaming of media includes a memory and a processor. The processor is operable to establish connections with user applications executing on a plurality of user devices. The processor is further operable to identify a list of user tracks associated with one of the plurality of users stored in the memory. The processor is further operable to stream tracks from the list of user tracks to each of the plurality of user applications synchronously such that each of the plurality of user applications plays the same tracks at approximately the same time. The processor is further operable to receive at least one comment from one of the computing devices. The processors is further operable to send the at least one comment to a remainder of the plurality of computing devices for display through the user applications.

18 Claims, 6 Drawing Sheets

(51) Int. Cl.
*H04N 21/43* (2011.01)
*G11B 27/10* (2006.01)
*G11B 27/00* (2006.01)
*H04N 21/41* (2011.01)
*H04N 21/414* (2011.01)
*H04N 21/61* (2011.01)

(56) References Cited

U.S. PATENT DOCUMENTS

| | | | |
|---|---|---|---|
| 2005/0192871 A1* | 9/2005 | Galuten | G06Q 20/123 |
| | | | 705/26.1 |
| 2006/0143236 A1* | 6/2006 | Wu | G11B 27/034 |
| 2006/0230107 A1* | 10/2006 | Yu | H04L 67/104 |
| | | | 709/204 |
| 2009/0265369 A1* | 10/2009 | Hyman | G06F 16/435 |
| 2010/0031366 A1 | 2/2010 | Knight et al. | |
| 2010/0042682 A1* | 2/2010 | Kaye | G11B 27/034 |
| | | | 709/203 |
| 2010/0132536 A1* | 6/2010 | O'Dwyer | G10H 1/0008 |
| | | | 84/609 |
| 2013/0246522 A1* | 9/2013 | Bilinski | H04N 21/4758 |
| | | | 709/204 |
| 2015/0100143 A1* | 4/2015 | Gao | H04L 65/4076 |
| | | | 700/94 |
| 2016/0050244 A1* | 2/2016 | Corlett | H04L 65/4084 |
| | | | 709/231 |
| 2016/0381436 A1* | 12/2016 | Yu | H04N 21/8358 |
| | | | 725/19 |
| 2017/0065887 A1* | 3/2017 | Colenbrander | A63F 13/355 |
| 2017/0093943 A1* | 3/2017 | Alsina | H04L 65/60 |
| 2017/0286051 A1* | 10/2017 | Mendes | G06F 3/165 |

* cited by examiner

SYSTEM AND METHOD FOR SYNCHRONIZED PLAYBACK OF DOWNLOADED STREAMS

CROSS-REFERENCE TO RELATED APPLICATION

This application claims the benefit of priority of U.S. provisional patent application No. 62/333,457 entitled "METHODS AND SYSTEMS FOR SYNCHRONOUS, INTERACTIVE CONTENT STREAMING SERVICE" filed on May 9, 2016, which is incorporated herein in its entirety by this reference.

BACKGROUND

Today, an increasing number of people use Internet streaming services for entertainment. Media content companies provide streaming media services including catalog services, a content delivery network, and per-stream billing services that allow media applications to stream content to individual listeners on mobile devices very cost effectively. Media streaming services are convenient, as they allow users to view desired media content on-demand and gain access to large catalogs of content at relatively low-cost. However, these services are not set up for multicast or broadcast delivery of media, which generally needs more expensive technology support to deliver and track playback for billing purposes. Moreover, media streaming can be a lonely experience, because other people do not see the same content at the same time, unless those other people are physically present in the same room. Further, sharing the content with other people in the same room on small mobile devices can be a difficult experience.

Numerous technologies exist for broadcast and/or multicast synchronized streaming of media ranging from low-level technology such as MPEG4 which provides clock synchronization primitives, to full-scale audio-over-IP systems. However, there remains a need for a system that delivers synchronized media playback to one or many users, mimicking the behavior of a multicast or broadcast network, but taking advantage of the low cost and ease-of-use of a streaming media content provider, and by doing so, drastically reducing the cost associated with synchronized streaming while leveraging widely-available computer and mobile phone technologies.

SUMMARY OF THE INVENTION

The present invention allows for the synchronous delivery of low-cost, easy-to-use, and on-demand streaming media to multiple users, mimicking a multi-cast or broadcast experience, without the need for an expensive, multicast-capable private network or dedicated and proprietary end-user devices. The present invention uses novel synchronization methods to synchronously deliver said media content to any computer or mobile device over existing public and private data networks.

The current application discloses methods and systems for synchronous, interactive content streaming service, enabling multiple users to interact with one another while simultaneously consuming synchronized streaming content. Specifically, a system and method for synchronized playback of downloaded streams is provided, which allows for synchronizing media downloaded in typical streaming formats (such as MP3 or AAC audio) between many users on mobile or stationary devices such as mobile phones or personal computers. Methods are presented to maintain both loose synchronization (to within 50 ms between streams) over a wide-area network down to tight synchronization (to within 12 ms, simultaneous to the human ear) in a local area network.

According to one embodiment, a server stores a user track list associated with the user. The server then synchronously streams the tracks from the user track list to multiple users, who then can chat with each other about the music that they are currently listening to. The users can make joint decisions, for example if they want to skip a track, or if they want to switch and start listening to a different user track list.

According to another embodiment, instead of streaming music, the server streams video. The users still can chat with each other about the video which they're watching, and can make joint decisions about skipping a video, or watching a different video.

According to another embodiment, an application running on the user device, such as a tablet or a phone, displays synchronized graphical visualization of music to which multiple users are listening. In addition to the graphical visualization, the application displays multiple effects widgets. Each effect widget, when inserted into the graphical visualization of music, creates a unique visual effect. For example, the visual effects can be a swirl, a stream of particles, or a spinning spiral galaxy. A user can insert one or more of the effects widgets into the graphical visualization, thus locally modifying the graphical visualization. When a user inserts an effects widgets, the other user's display is updated in real time.

According to one embodiment, a method for synchronized streaming of media is provided. The method may include, at a server having a memory and a processor, establishing connections with user applications executing on a plurality of user devices. The method may further include identifying a list of user tracks associated with one of the plurality of users stored on the memory. The method may further include streaming tracks from the list of tracks to each of the plurality of user applications synchronously such that each of the plurality of user applications plays the same track at approximately the same time. The method may further include receiving at least one comment from one of the computing devices. The method may further include sending the at least one comment to a remainder of the plurality of computing devices for display through the user applications.

According to another embodiment, the method may further include causing to display a synchronized graphical visualization of the music on each of the plurality of user applications. The method may further include causing to display a plurality of effects widgets on each of the plurality of user applications, wherein each of the plurality of effects widgets represents a unique visual effect, and wherein a user selects a desired visual effect by placing the corresponding effects widget into the synchronized graphical visualization. The method may further include, in response to a selection of a visual effect by a user, updating the synchronized graphical visualization of the music to reflect the chosen visual effect on the plurality of user applications.

According to another embodiment, a system for synchronized streaming of media is provided. The system may include a memory and a processor. The processor may be operable to establish connections with user applications executing on a plurality of user devices. The processor may further be operable to identify a list of user tracks associated with one of the plurality of users stored in the memory. The processor may further be operable to stream tracks from the list of user tracks to each of the plurality of user applications synchronously such that each of the plurality of user applications plays the same tracks at approximately the same time. The processor may further be operable to receive at least one comment from one of the computing devices. The processors may further be operable to send the at least one comment to a remainder of the plurality of computing devices for display through the user applications.

According to another embodiment, the processor may be further operable to cause to display a synchronized graphical visualization of the music on each of the plurality of user applications. The processor may be further operable to cause to display a plurality of effects widgets on each of the plurality of user applications, wherein each of the plurality of effects widgets represents a unique visual effect, and wherein a user selects a desired visual effect by placing the corresponding effects widget into the synchronized graphical visualization. The processor may be further operable to, in response to a selection of a visual effect by a user, update the synchronized graphical visualization of the music to reflect the chosen visual effect on the plurality of user applications.

According to another embodiment, a computer program product for synchronized streaming of media is provided. The computer program product may include a computer readable storage medium having computer readable program code embodied thereon. The computer readable program code may be configured for establishing connections with user applications executing on a plurality of user devices. The computer readable program code may further be configured for identifying a list of user tracks associated with one of the plurality of users stored on the memory. The computer readable program code may further be configured for streaming tracks from the list of tracks to each of the plurality of user applications synchronously such that each of the plurality of user applications plays the same track at approximately the same time. The computer readable program code may further be configured for receiving at least one comment from one of the computing devices. The computer readable program code may further be configured for sending the at least one comment to a remainder of the plurality of computing devices for display through the user applications.

According to another embodiment, the computer readable program code may further be configured for causing to display a synchronized graphical visualization of the music on each of the plurality of user applications. The computer readable program code may further be configured for causing to display a plurality of effects widgets on each of the plurality of user applications, wherein each of the plurality of effects widgets represents a unique visual effect, and wherein a user selects a desired visual effect by placing the corresponding effects widget into the synchronized graphical visualization. The computer readable program code may further be configured for, in response to a selection of a visual effect by a user, updating the synchronized graphical visualization of the music to reflect the chosen visual effect on the plurality of user applications.

According to another embodiment, the tracks may be video.

According to another embodiment, the tracks may be music.

According to another embodiment, streaming tracks may be accomplished via loose synchronization.

According to another embodiment, streaming track may be accomplished via tight synchronization.

In all of the above embodiments, the server is configured to automatically comply with the legal licensing requirements.

Still other aspects, features, and advantages of the invention are readily apparent from the following detailed description when illustrated by a number of particular embodiments and implementations, including the best mode contemplated for carrying out the invention. The invention is also capable of other and different embodiments, and several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

These and other objects, features, and characteristics will become more apparent to those skilled in the art from a sturdy of the following Detailed Description in conjunction with the appended claims and drawings, all of which form a part of this specification. While the accompanying drawings include illustrations of various embodiments, the drawings are not intended to limit the claimed subject matter.

DETAILED DESCRIPTION

In the following description, for the purposes of explanation, numerous specific details are set forth in order to provide a thorough understanding of the embodiments of the invention. One skilled in the art will recognize that the embodiments of the invention may be practiced without these specific details or with an equivalent arrangement. In other instances, well-known structures and devices are shown in block diagram form in order to avoid unnecessarily obscuring the embodiments of the invention.

The presently disclosed subject matter is presented with sufficient details to provide an understanding of one or more particular embodiments of broader inventive subject matters. The descriptions expound upon and exemplify particular features of those particular embodiments without limiting the inventive subject matters to the explicitly described embodiments and features. Considerations in view of these descriptions will likely give rise to additional and similar embodiments and features without departing from the scope of the presently disclosed subject matter.

Figure 1:
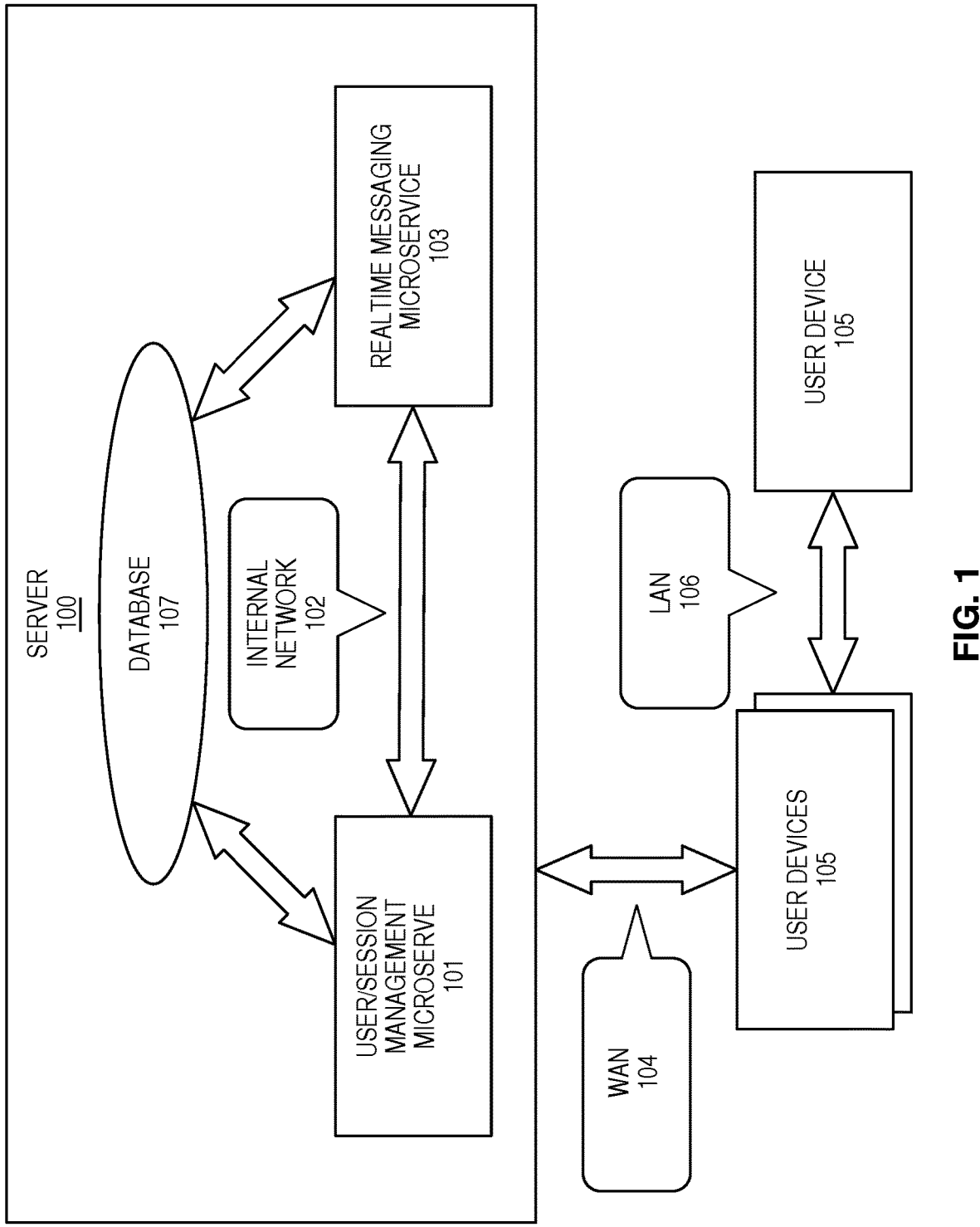
FIG. 1 is a diagram of the system architecture according to certain embodiments of the present invention.

Referring now to FIG. 1, the system is composed of a server 100 containing a user/session management microservice 101, a real-time microservice 103, and a database 107 which communicate on an internal network 102. The server 100 complex communicates with one or more user devices 105 over a wide-area network (WAN) 104, and the user devices 105 may communicate with each other over a local-area network (LAN) 106 in the case of "tight" synchronization, or they may be completely autonomous in the case of "loose" synchronization. These novel synchronization methods allow synchronous delivery of media content to any computer or mobile device over existing public and private data networks.

Synchronized media playback in both the loose and tight modes relies on clock synchronization between all of the entities involved in the playback experience, including the user devices 105, and server microservices 101, 103. For loose synchronization, one embodiment of this invention uses widely-available Network Time Protocol (NTP) running on each of the microservices 101, 103 and user devices 105. For tight synchronization, one embodiment of this invention uses the Precision Time Protocol (PTP) running on all nodes, or PTP running in the server nodes and a GPS-based time synchronization protocol running in suitably-enabled mobile phones, or GPS-augmented time synchronization protocol running in a mobile carrier network.

Tight synchronization is not achievable with NTP alone, but requires PTP or GPS-based clocks. However, the logic and algorithms implemented in the system are designed to attempt to achieve "perfect" synchronization (0 ms synchronization) at all times, achieving tight or loose synchronization between any given user devices 105 in the system based solely on what clock synchronization technology is available to the components of the system. In this way, the system can be implemented as a loose-synchronization system, a tight-synchronization system, or as a hybrid system, partitioned such that a partition of the system provides tight synchronization to those user devices 105 capable of tight synchronization (by means of stronger clock synchronization), thereby tailoring behavior to available resources, and reducing cost of the system as a whole.

UTC timestamps are used throughout the system to stay independent of local time differences and interpretation (e.g., timezones and daylight savings time changes).

The microservices 101, 103 can be implemented using standard server technologies such as Ruby on Rails (RoR) or other equivalent technology, and in the case of the real-time microservice, should be implemented with care to reduce scheduling latency for operations that are time-sensitive, as discussed below. The database 107 can be implemented with standard high-performance database technologies such as MongoDB or PostGRES database technology.

In some embodiments, the server 100 may receive at least one comment from one of the user devices 105 over a data network, such as a WAN, and may send the at least one comment to a remainder of the plurality of user devices 105 for display through the user applications over the data network.

The WAN 104 and LAN 106 are exemplary communication networks and the present invention is not limited to the use of those networks. The one or more user devices 105 may communicate with the server 100 complex or other user devices 105 via any one or more networks such as a data network, a wireless network, a telephony network, or any combination thereof. The data network may be any LAN, WAN, metropolitan area network (MAN), a public data network (e.g., the Internet), short range wireless network, or any other suitable packet-switched network, such as a commercially owned, proprietary packet-switched network (e.g., a proprietary cable or fiber-optic network, and the like, or any combination thereof). In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The user devices 105 executing user applications may be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, the accessories and peripherals of these devices, or any combination thereof.

Figure 2:
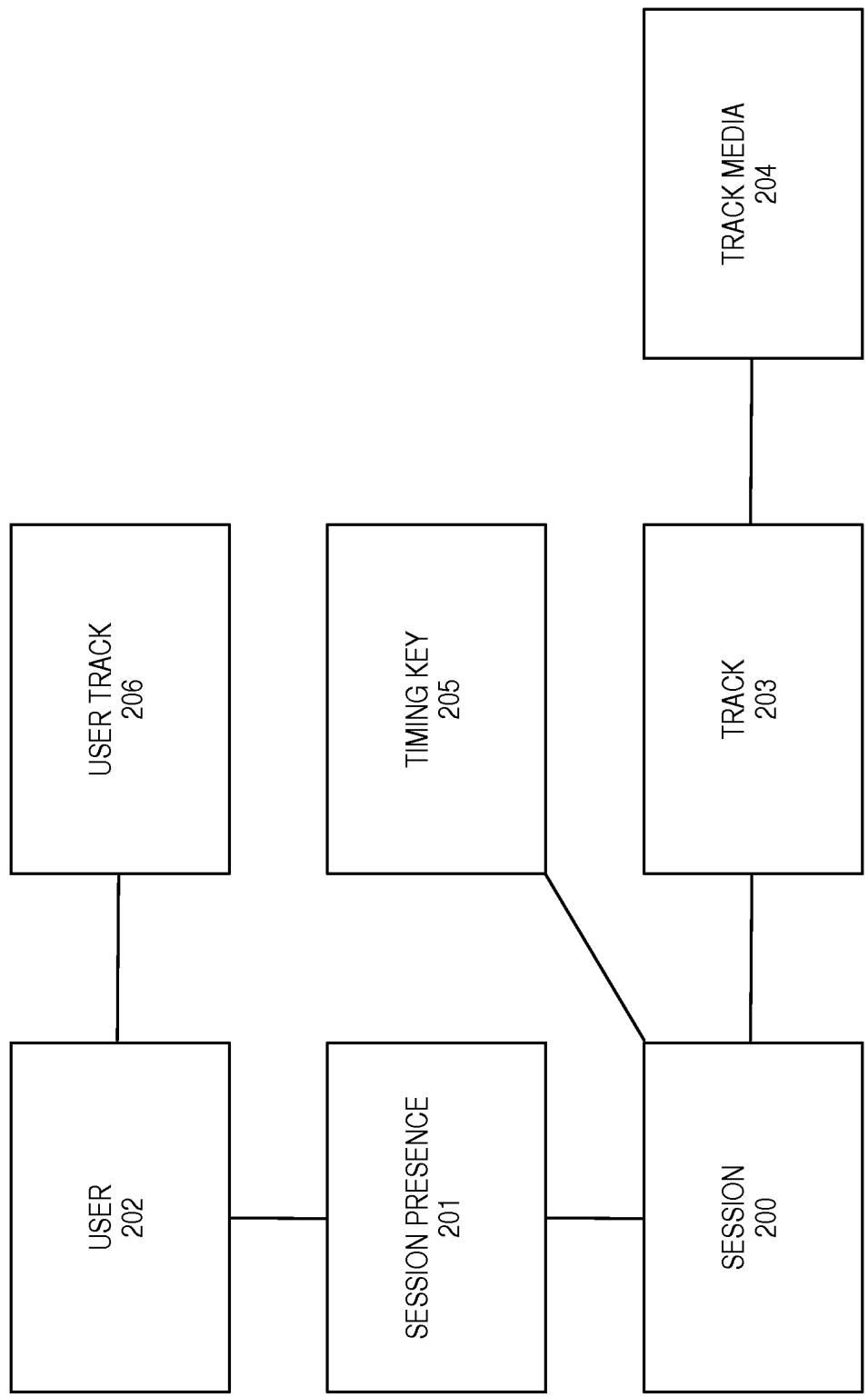
FIG. 2 is a diagram of the data architecture in a database according to certain embodiments of the present invention.

Referring now to FIG. 2, data relationships are maintained in the database 107. The system as a whole supports unlimited simultaneous sessions 200, each containing an ordered list of tracks 203 that make up the playback experience. Each track 203 has a "duration" field and multiple associated track media 204 objects which are individually trackable, downloadable, streamable media files in standard download format (such as MP3, AAC, etc. for audio; MPEG4, AVI, MOV, etc. for video). A session 200 furthermore contains a timing key 205, which is a reference to a timing signal generator process that runs on the real-time microservice 103 and will be described in detail below. Each session 200 also contains an unordered list of session presences 201 which each have an associated user 202, which represent a user device 105 in the system.

Tracks 203 as used herein is not limited to audio files, but may include other streamable media files including video.

The session 200 object represents a synchronized playback experience, and includes fields that help manage the timing, duration, user participation, and content of the playback experience. This object will be described in more detail below. The user 202 object includes user-specific data which can include user identity, social graph (friends or followers), listening preferences, and the like. The user 202 object also includes a list of user tracks 206 which consist of tracks 203 that the user 202 has previously determined that they like to listen to, which can, depending on the desired behavior, be added to the session's 200 track 203 list once the user 202 has joined a session 200. The session presence 201 object contains an "is present" field that signifies whether the associated user is currently present in the session 200, and allows the system to determine the total number of participants in a session 200 over time, including those who have left the session 200.

The user/session management microservice 101 is responsible for providing behaviors for user devices 105 including adding new users 202 to the system, managing their listening preferences, and other user 202 management functions. In addition to general user 202 behaviors, the user/session management microservice 101 is responsible for session 200 management functions on behalf of users 202 in the system, including the following functions in Table 1:

TABLE 1

Session Management Functions

| Behavior | Affects Timing? | Description |
|---|---|---|
| 300 Join | NO | Join an existing session 200. A session presence 201 is created for the user 202 and the is added to the synchronized playback user 202 experience. |
| 301 Start | YES | Start a new session 200. A session 200 is created in the system and a session presence 201 is created for the user 202. |
| 302 Leave | NO | Leave an existing session 200. The session presence 201 "is_present" field is set to FALSE for the user 202, removing the user 202 from the synchronized playback experience. |
| 303 Modify | NO | Modifies a user's 202 contribution to the session 200. If set to TRUE, the user's 202 user tracks 206 are added to the session 200 track 203 list to be played back to all of the session's 200 users 202. If set to FALSE, the user's 202 user tracks 203 are removed from the session 200 track 203 list if they had initially been added. |
| 304 Advance | YES | Skips the currently playing session 200 track 203. |
| 305 Current | NO | Returns the currently playing track 203 in the session 200. |
| 306 Next | NO | Returns the next track 203 to play in the session 200. |
| 307 Resync | NO | Returns session 200 information that allows the requesting user 202 to synchronize to the current playback position in the session 200. |
| 308 List | NO | Returns a list of active sessions 200 in the system based on some filtering criteria that establishes relevance for the user 202, for example sessions 200 that the user's 202 social graph members are currently in, or sessions 200 who's users 202 are geographically close the user 202. |

Some of the session management functions in Table 1 affect the session timing and therefore the synchronization of the session 200 for all listening users 202. Those functions are marked as "YES" in the "Affects Timing?" column and flow diagrams of these important behaviors will be provided below.

Figure 3:
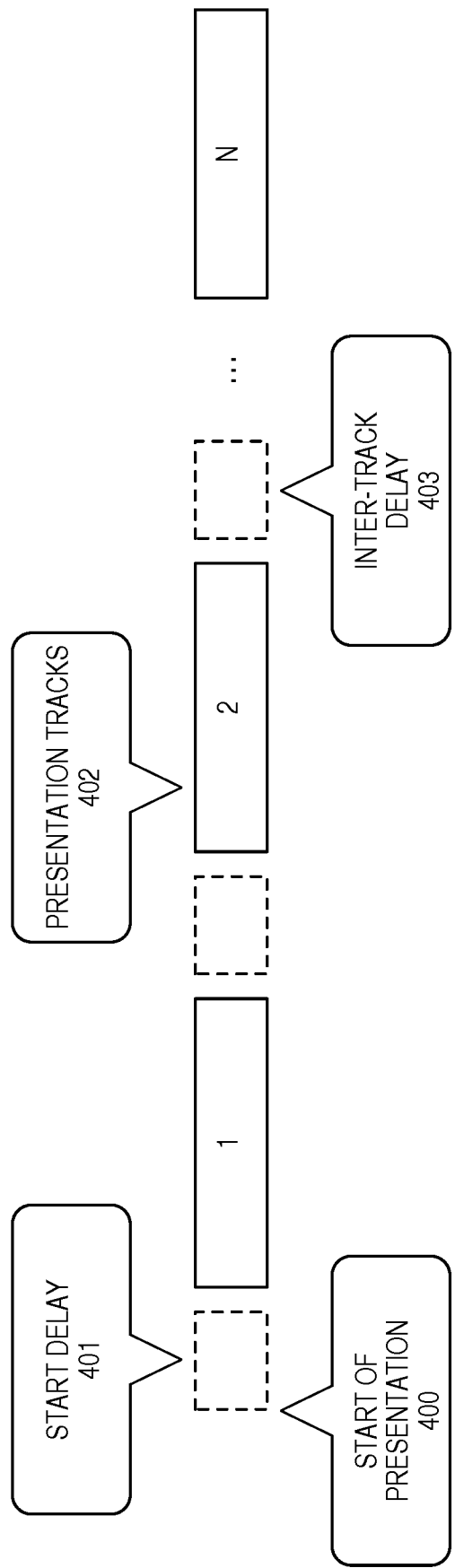
FIG. 3 is a diagram of the playback presentation order according to certain embodiments of the present invention.

Referring now to FIG. 3, a session 200 manages the playback presentation, which is defined as an ordered presentation of presentation tracks 402 at specific timestamps, with programmed delays inserted before the first presentation track 402 to play (Start Delay, 401) and between presentation tracks 402 (inter-track delay, 403) to allow synchronization by the user devices 105. Presentation tracks 402 are session tracks 203 that have been resolved into a unique track media 204 object for each individual user device 105 that is receiving the presentation.

A timing signal is created when a session 200 is started 301, modified through various functions on a session 200 such as an advance 304 request from a user device 105, or modified automatically by the system when a presentation track 402 has finished playing (its track 203 duration has elapsed). The timing signal is associated to a session 200 by a unique timing key 205 and at any given time, a session 200 has one and only one active timing key 205. A timing signal includes the following fields described in Table 2.

TABLE 2

Timing Signal Fields

| Field | Description |
|---|---|
| 501 track_id | The system identifier for the presentation track 402. |
| 502 played_at | A timestamp, in UTC, for when the first media sample of the presentation track 402 should be emitted from the media player. |
| 503 advance_at | A timestamp, in UTC, for when the next timing signal will be generated. |
| 504 delta | The inter-track 203 and start delay 401 duration, in seconds. |

The initial timing signal is created when a session start function 301 is requested by a user device 105. A start delay 401 is added to offset any latencies that are accumulated in the actual request by the user device 105 (for example, network delays over a mobile network or latencies induced by load on the server itself), and can be dynamic, such that the start delay 401 can accommodate varying network conditions or server load conditions. The initial timing signal is delivered to the single user device 105 that requested the start 301 function, after which the user device 105 starts its synchronization process as described below. Once a session 200 is started via the start 301 function, other user devices 105 can perform a join 300 function at any time during the presentation to participate in the session 200, upon which they are delivered the current timing signal for the session 200.

For each timing signal, the system retrieves the presentation track 402 and sets the track_id field 501 based on the currently scheduled track 203, computes a played_at 502 timestamp and an advance_at 503 timestamp based on the presentation track 402 duration, and schedules an operation in the system to generate a new timing signal once the advance_at 503 timestamp has been reached. When the scheduled operation executes, the system retrieves the new presentation track 402 and sets the new track_id 501 and computes the timestamps for this new track 203. For these automatic generation operation, the original timing key 205 is maintained.

All timing signals subsequent to the first for each user device 105 are delivered to all session 200 participants using the real-time microservice 103, which in one embodiment uses the MQTT messaging protocol to deliver the timing signal with a guaranteed Quality-of-Service (QOS) to narrow-cast the timing signal to just the participants of the session 200.

The system allows any participant to perform an advance 304 function to skip the currently playing track 203. Each of these advance 304 operations generates a new timing signal by computing the track_id 501 and timestamps for the next track 203 in the presentation, storing a new unique timing key 205 in the session 200, and scheduling an associated operation in the system to automatically update the associated timing signal. The system resolves multiple asynchronous advance 304 requests by requiring all scheduled timing signal generator operations to validate their timing key 205 with the session's 200 unique timing key 205, and to forfeit their management of the timing signal if they have been replaced by a more recent advance 304 request.

The loose synchronization method is implemented in the user device 105, and takes advantage of the session 200 start delay 401 and inter-track delay 403 to align each presentation track 402 with the associated played_at 502 timestamp in the timing signal. The loose synchronization method assumes that the media clock (the clock that is driving output sample rate, for example in an audio Digital to Audio Converter (DAC)) skew relative to the system clock is well within the loose synchronization timing limits (50 ms) within the duration of each individual presentation track 402 (which, for music, are on average 4 minutes long) and ignores jitter between the two clocks completely.

In one embodiment, using a streaming media player, a dynamic representation of the presentation is created by inserting locally-stored "silence media files" (e.g. an MP3 file of specified duration that contains only silence) of twice the duration of the start delay 401 and inter-track delay 403 prior to every presentation track 402, such that the streaming media player, once started, is never stopped. Synchronization is achieved by modifying the actual duration of silence that is played based on whether the current stream position is ahead of or behind the played_at 502 timestamp of the current timing signal. In this embodiment, the streaming media player must allow control of the each silence media file's actual playback duration to within the loose synchronization limit (50 ms).

Figure 4:
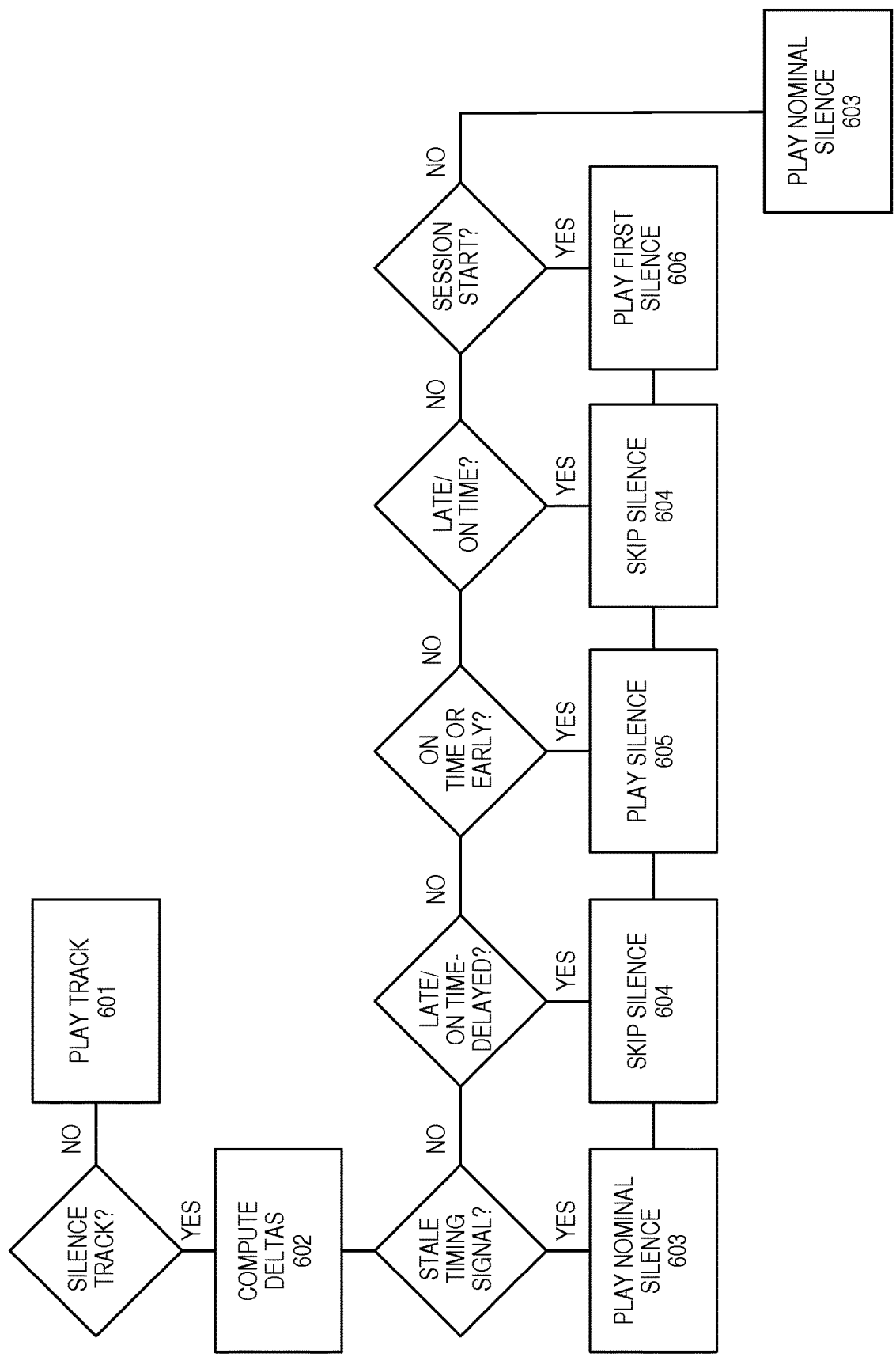
FIG. 4 is a flow chart diagram of the synchronization process according to certain embodiments of the present invention.
Figure 6:
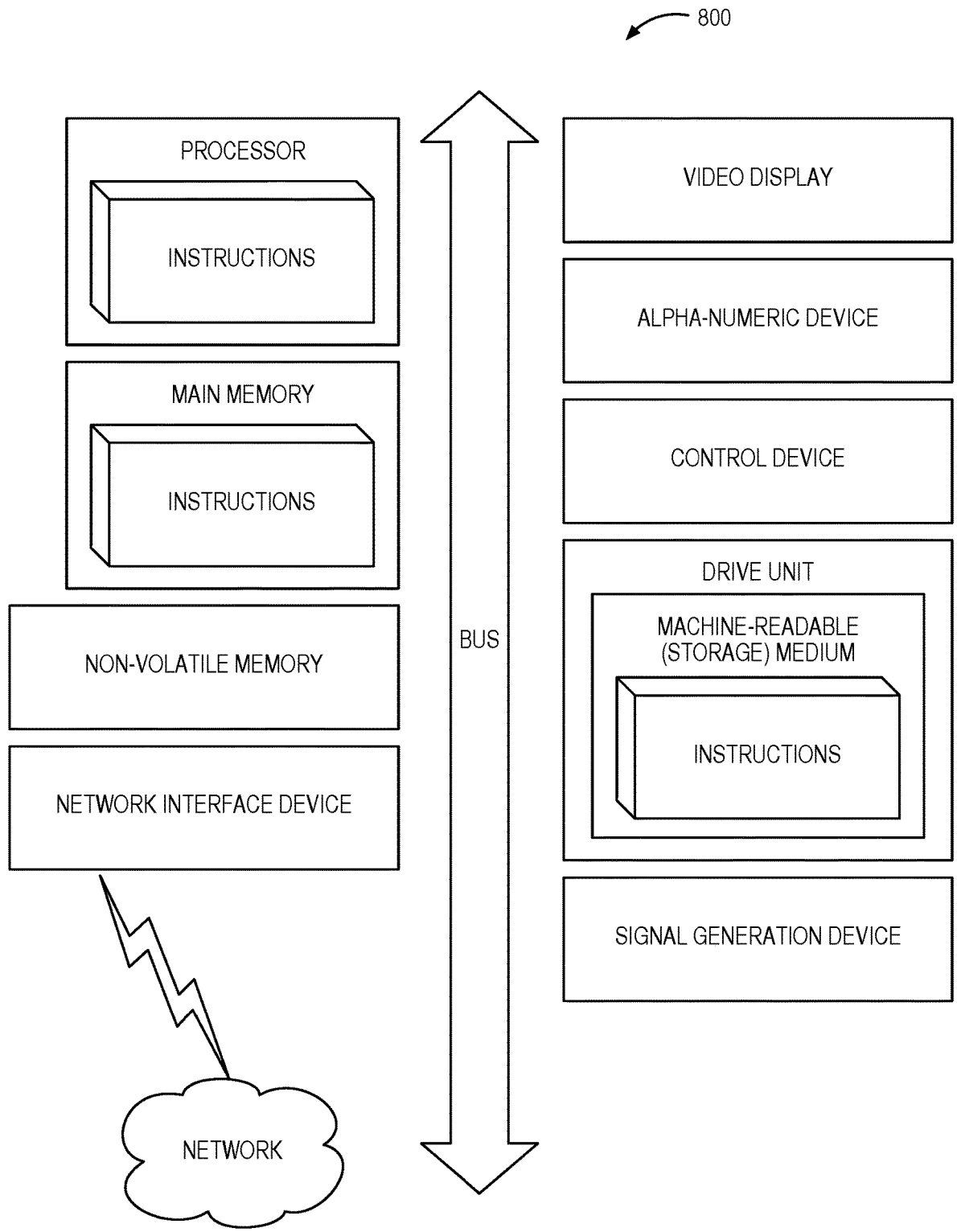
FIG. 6 is a diagrammatic representation of a machine in the example form of a computer system within which a set of instructions, for causing the machine to perform any one or more of the methodologies or modules discussed herein, may be executed.

Referring now to FIG. 4, the timing signals are delivered to the user devices 105 using an appropriate delivery mechanism and quality of service, but due to normal network conditions, these timing signals may arrive late or not at all. The flow chart in FIG. 6 depicts the process used to interpret the timing signal values, use heuristics to determine whether the timing signal has been received on time, or late, and attempt to synchronize accordingly. The flow starts by determining whether the current stream to play is a silence track, and if not (it is a presentation track 402) it is played immediately. For a silence track, the timing signal timestamps 502, 503 are converted to delta-values by subtracting the user device's 105 current clock value, and then those delta-values are used in the subsequent conditionals to determine what duration to play the silence track. In the case of a stale timing signal or if the state of the timing signal cannot be determined, the user device 105 will play the nominal silence duration 603, which is specified by the timing signal delta 504 field. If the user device 105 is late to play the current track 203 identified by the timing signal, the silence track is skipped altogether 604. If the user device 105 is early or on time to play the current track 203, it computes a silence track duration 605 that puts the subsequent presentation track 402 presentation to within 50 ms of the played_at 502 timestamp in the timing signal. If the user device 105 identifies that this is the first silence track in a presentation, it computes and plays a silence track duration 606 that would put the first presentation track 402 to within 50 ms of the first played_at 502 timestamp in the timing signal.

In another embodiment, a non-streaming media player is used, and a timing delay is generated using a system timing mechanism to schedule an operation that starts the next presentation track 402 to within 50 ms of the played_at 502 timestamp of the current timing signal. In each case, the presentation timestamp at which the first media sample is emitted from the media hardware should be controllable to within the loose synchronization limit (50 ms).

Tight synchronization builds upon the loose synchronization method, but recognizes that to achieve sub-12 ms clock synchronization over the duration of a long media presentation requires finer-grained synchronization of the media presentation timestamps to the synchronized clocks. To accomplish this, one of the enhanced clock synchronization mechanisms (PTP or GPS-enabled) must be used to achieve a synchronized presentation timestamp. However, clock skew and/or jitter between the system clock and the media hardware clock must be taken into consideration and accounted for.

One embodiment of tight synchronization uses the loose synchronization method and adds a clock synchronization algorithm between the system clock and the media clock, such as a software-implemented Phase-locked Loop (SPLL). This algorithm ensures the media clock and system clock are synchronized within 12 ms at all times, not just at the start of each presentation track 402 in the presentation.

Because the human ear is very sensitive to clock modification (jitter) above 0.02%, which is considered audible, media clock modification for audio output should be used sparingly and is best used in conjunction with the above loose synchronization method.

Figure 5:
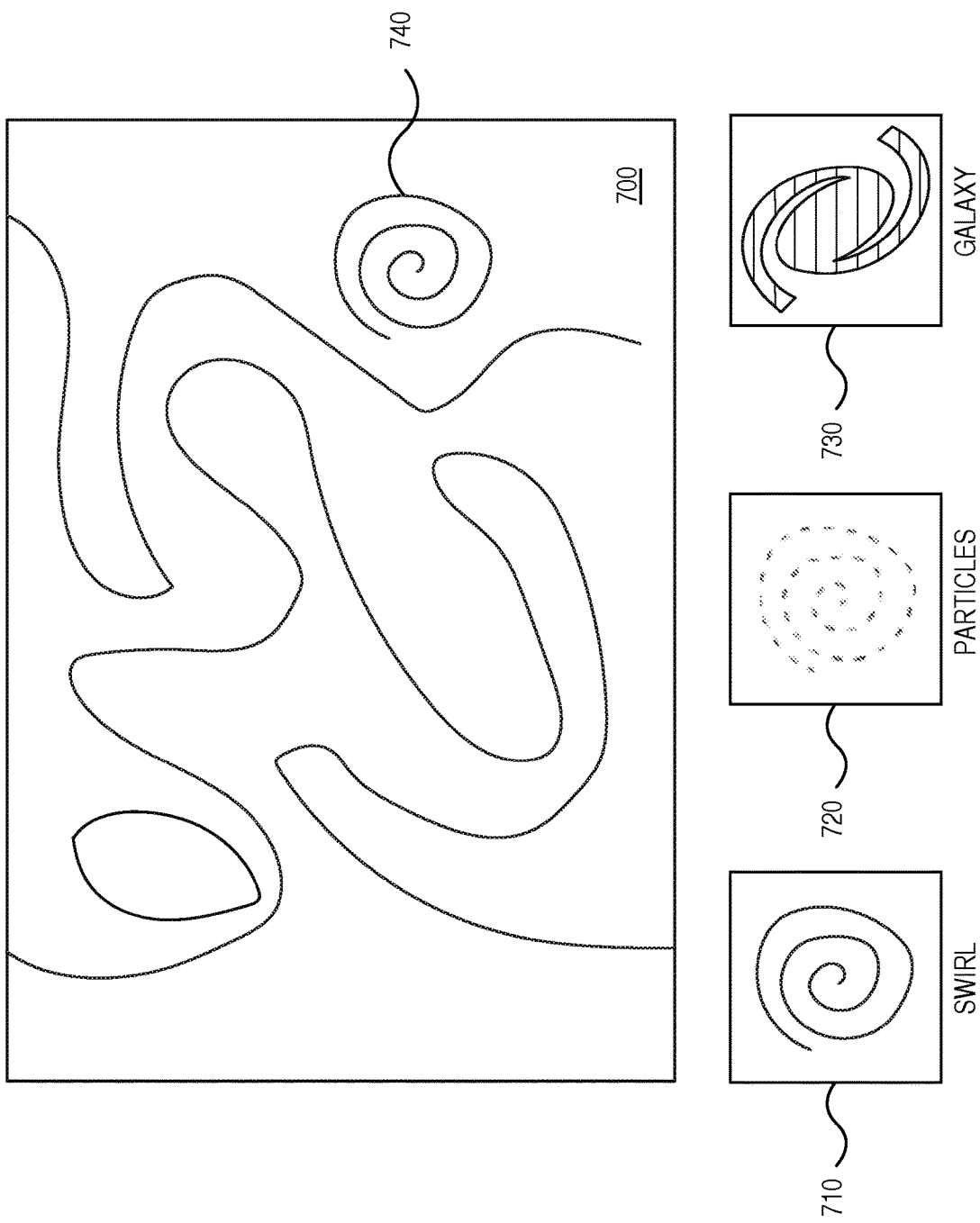
FIG. 5 is a diagram of the music visualizer, according to certain embodiments of the present invention.

Referring now to FIG. 5, a music visualizer according to at least one embodiment of the present invention is shown. An application running on a user device 105 displays synchronized graphical visualization of music 700 to which multiple users are listening. In addition to the graphical visualization, the application displays multiple effects widgets 710, 720, 730. Each effect widget 710, 720, 730, when inserted into the graphical visualization of music 700, creates a unique visual effect. For example, the visual effect can be a swirl, a stream of particles, or a spinning spiral galaxy. A user can insert one or more of the effects widgets 710, 720, 730, the other users' display is updated in real time.

In at least one embodiment of the present invention, a method for synchronized streaming of media is provided. The method may comprise, at a server 100 having a memory and a processor, establishing connections with user applications executing on a plurality of user devices 105. The method may further comprise identifying a list of user tracks 206 associated with one of the plurality of users 202 stored on the memory. The method may further comprise streaming tracks 203 from the list of user tracks 206 to each of the plurality of user applications synchronously such that each of the plurality of user applications plays the same track 203 at approximately the same time. The method may further comprise receiving at least one comment from one of the user device 105 and sending the at least one comment to a remainder of the plurality of user device 105 for display through the user applications.

The method may further comprise causing to display a synchronized graphical visualization 700 of the music on each of the plurality of user applications and further causing to display a plurality of effects widgets 710, 720, 730 on each of the plurality of user applications, wherein each of the plurality of effects widgets 710, 720, 730 represents a unique visual effect, and wherein a user 202 selects a desired visual effect by placing the corresponding effects widget 710, 720, 730 into the synchronized graphical visualization 700. The method may further comprise, in response to a selection of a visual effect by a user 202, updating the synchronized graphical visualization 700 of the music to reflect the chosen visual effect on the plurality of user applications.

In at least one embodiment of the present invention, a system for synchronized streaming of media is provided. The system may comprise a memory and a processor, the processor operable to establish a connection with user applications executing on a plurality of user devices 105. The processor may further be operable to identify a list of user tracks 206 associated with one of the plurality of users 202 stored on the memory. The processor may further be operable to stream tracks 203 from the list of user tracks 206 to each of the plurality of user applications synchronously such that each of the plurality of user applications plays the same track 203 at approximately the same time. The processor may further be operable to receive at least one comment from one of the user device 105 and send the at least one comment to a remainder of the plurality of user device 105 for display through the user applications.

The processor may further be operable to cause to display a synchronized graphical visualization 700 of the music on each of the plurality of user applications and further causing to display a plurality of effects widgets 710, 720, 730 on each of the plurality of user applications, wherein each of the plurality of effects widgets 710, 720, 730 represents a unique visual effect, and wherein a user 202 selects a desired visual effect by placing the corresponding effects widget 710, 720, 730 into the synchronized graphical visualization 700. The processor may further be operable to, in response to a selection of a visual effect by a user 202, update the synchronized graphical visualization 700 of the music to reflect the chosen visual effect on the plurality of user applications.

In at least one embodiment of the present invention, a computer program product for synchronized streaming of media is provided. The computer program product may comprise a computer readable storage medium having computer readable program code embodied thereon, the computer readable program code configured for establishing connections with user applications executing on a plurality of user devices 105. The computer readable program code may further be configured for identifying a list of user tracks 206 associated with one of the plurality of users 202 stored on the memory. The computer readable program code may further be configured for streaming tracks 203 from the list of user tracks 206 to each of the plurality of user applications synchronously such that each of the plurality of user applications plays the same track 203 at approximately the same time. The computer readable program code may further be configured for receiving at least one comment from one of the user device 105 and sending the at least one comment to a remainder of the plurality of user device 105 for display through the user applications.

The computer readable program code may further be configured for causing to display a synchronized graphical visualization 700 of the music on each of the plurality of user applications and further causing to display a plurality of effects widgets 710, 720, 730 on each of the plurality of user applications, wherein each of the plurality of effects widgets 710, 720, 730 represents a unique visual effect, and wherein a user 202 selects a desired visual effect by placing the corresponding effects widget 710, 720, 730 into the synchronized graphical visualization 700. The computer readable program code may further be configured for, in response to a selection of a visual effect by a user 202, updating the synchronized graphical visualization 700 of the music to reflect the chosen visual effect on the plurality of user applications.

In yet other embodiments of the present invention, the tracks 203 are video.

In yet other embodiments of the present invention, the tracks 203 are music.

In yet other embodiments of the present invention, streaming tracks 203 is accomplished via loose synchronization.

In yet other embodiments of the present invention, streaming tracks 203 is accomplished via tight synchronization.

Referring now to FIG. 6, a diagrammatic representation of a machine in the example form of a computer system 800 within which a set of instructions, for causing the machine to perform any one or more of the methodologies or modules discussed herein, may be executed.

In the example of FIG. 6, the computer system 800 includes a processor, memory, non-volatile memory, and an interface device. Various common components (e.g., cache memory) are omitted for illustrative simplicity. The computer system 800 is intended to illustrate a hardware device on which any of the components described in this specification can be implemented. The computer system 800 can be of any applicable known or convenient type. The components of the computer system 800 can be coupled together via a bus or through some other known or convenient device.

This disclosure contemplates the computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EE PROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 800. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 6 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the computer-readable medium or computer-readable storage medium is shown in an exemplary embodiment to be a single medium, the term "computer-readable medium" and "computer-readable storage medium" should be taken to include a single medium or multiple media (e.g., a centralized or distributed database, and/or associated caches and servers) that store the one or more sets of instructions. The term "computer-readable medium" and "computer readable storage medium" shall also be taken to include any medium that is capable of storing, encoding or carrying a set of instructions for execution by the computer and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all exam page on pies in which a change in state for a binary one to a binary zero or vice-versa in a memory device may comprise a transformation, such as a physical transformation. Rather, the foregoing is intended as illustrative examples.

A storage medium typically may be non-transitory or comprise a nontransitory device. In this context, a nontransitory storage medium may include a device that is tangible, meaning that the device has a concrete physical form, although the device may change its physical state. Thus, for example, nontransitory refers to a device remaining tangible despite this change in state.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112 other aspects may likewise be embodied as a means-plus-function claim, or in other forms, such as being embodied in a computer-readable medium. (Any claims intended to be treated under 35 U.S.C. § 112 will begin with the words "means for".) Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example reference to "an additive" can include a plurality of such additives, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments, +/−10%, in some embodiments +/−5%, in some embodiments +/−1%, in some embodiments +/−0.5%, and in some embodiments, +/−0.1%, from the specified amount, as such variations are appropriate in the disclosed products and methods.

What is claimed is:

1. A method comprising:
   at a server having a memory and a processor:
   establishing connections with user applications executing on a plurality of user devices;
   receiving a request from one of the user applications to start a streaming session;
   starting a streaming session in response to the request from the one of the user applications;

identifying a list of user tracks stored on the memory selected by a user associated with the one of the user applications;

sending a notification to at least one other user application that the streaming session has started;

receiving a request from the at least one other user application to join the streaming session;

adding the at least one other user application to the streaming session;

adding tracks selected by another user associated with the at least one other user application to the list of user tracks;

streaming tracks from the list of user tracks to each of the plurality of user applications synchronously such that each of the plurality of user applications plays the same track at approximately the same time;

receiving at least one advance track request from one of the user devices;

scheduling an operation to stream a next track in the list of user tracks in response to the at least one advance track request;

generating a timing key associated with the at least one advance track request, wherein the timing key is indicative of the time at which the at least one advance track request was received;

verifying whether the timing key is the most recent timing key generated:
  if the timing key is the most recent timing key generated, executing the scheduled operation to stream the next track;
  if the timing key is not the most recent timing key generated, canceling the scheduled operation to stream the next track;

receiving at least one comment from one of the user devices; and sending the at least one comment to a remainder of the plurality of user devices for display through the user applications.

2. The method of claim 1, wherein the tracks are video.

3. The method of claim 1, wherein the tracks are music.

4. The method of claim 3, further comprising:

causing to display a synchronized graphical visualization of the music on each of the plurality of user applications;

causing to display a plurality of effects widgets on each of the plurality of user applications, wherein each of the plurality of effects widgets represents a unique visual effect, and wherein a user selects a desired visual effect by placing the corresponding effects widget into the synchronized graphical visualization; and in response to a selection of a visual effect by a user, updating the synchronized graphical visualization of the music to reflect the chosen visual effect on the plurality of user applications.

5. The method of claim 1, wherein streaming tracks is accomplished via loose synchronization.

6. The method of claim 1, wherein streaming tracks is accomplished via tight synchronization.

7. A system comprising:
a memory; and
a processor operable to:
  establish connections with user applications executing on a plurality of user devices;
  receive a request from one of the user applications to start a streaming session;
  start a streaming session in response to the request from the one of the user applications;
  identifying a list of user tracks stored on the memory selected by a user associated with the one of the user applications;
  send a notification to at least one other user application that the streaming session has started;
  receive a request from the at least one other user application to join the streaming session;
  add the at least one other user application to the streaming session;
  add tracks selected by another user associated with the at least one other user application to the list of user tracks;
  stream content from the list of content to each of the plurality of user applications synchronously such that each of the plurality of user applications plays the same content at approximately the same time;
  schedule an operation to stream a next track in the list of user tracks in response to the at least one advance track request;
  generate a timing key associated with the at least one advance track request, wherein the timing key is indicative of the time at which the at least one advance track request was received;
  verify whether the timing key is the most recent timing key generated:
    if the timing key is the most recent timing key generated, execute the scheduled operation to stream the next track;
    if the timing key is not the most recent timing key generated, cancel the scheduled operation to stream the next track;
  receive at least one comment from one of the user devices; and
  send the at least one comment to a remainder of the plurality of user devices for display through the user applications.

8. The system of claim 7, wherein the tracks are video.

9. The system of claim 7, wherein the tracks are music.

10. The system of claim 9, wherein the processor is further operable to:
  cause to display a synchronized graphical visualization of the music on each of the plurality of user applications;
  cause to display a plurality of effects widgets on each of the plurality of user applications, wherein each of the plurality of effects widgets represents a unique visual effect, and wherein a user selects a desired visual effect by placing the corresponding effects widget into the synchronized graphical visualization; and
  in response to a selection of a visual effect by a user, update the synchronized graphical visualization of the music to reflect the chosen visual effect on the plurality of user applications.

11. The system of claim 7, wherein streaming tracks is accomplished via loose synchronization.

12. The system of claim 7, wherein streaming tracks is accomplished via tight synchronization.

13. A computer program product comprising:
a computer readable non-transitory storage medium having computer readable program code embodied thereon, the computer readable program code configured for:
  establishing connections with user applications executing on a plurality of user devices;
  receiving a request from one of the user applications to start a streaming session;
  starting a streaming session in response to the request from the one of the user applications;

identifying a list of user tracks stored on the memory selected by a user associated with the one of the user applications;
sending a notification to at least one other user application that the streaming session has started;
receiving a request from the at least one other user application to join the streaming session;
adding the at least one other user application to the streaming session;
adding tracks selected by another user associated with the at least one other user application to the list of user tracks;
streaming content from the list of content to each of the plurality of user applications synchronously such that each of the plurality of user applications plays the same content at approximately the same time;
scheduling an operation to stream a next track in the list of user tracks in response to the at least one advance track request;
generating a timing key associated with the at least one advance track request, wherein the timing key is indicative of the time at which the at least one advance track request was received;
verifying whether the timing key is the most recent timing key generated:
   if the timing key is the most recent timing key generated, executing the scheduled operation to stream the next track;
   if the timing key is not the most recent timing key generated, canceling the scheduled operation to stream the next track;
receiving at least one comment from one of the user devices; and
sending the at least one comment to a remainder of the plurality of user devices for display through the user applications.

14. The computer program product of claim 13, wherein the tracks are video.

15. The computer program product of claim 13, wherein the tracks are music.

16. The computer program product of claim 15, wherein the computer readable program code is further configured for:
causing to display a synchronized graphical visualization of the music on each of the plurality of user applications;
causing to display a plurality of effects widgets on each of the plurality of user applications, wherein each of the plurality of effects widgets represents a unique visual effect, and wherein a user selects a desired visual effect by placing the corresponding effects widget into the synchronized graphical visualization; and
in response to a selection of a visual effect by a user, updating the synchronized graphical visualization of the music to reflect the chosen visual effect on the plurality of user applications.

17. The computer program product of claim 13, wherein streaming tracks is accomplished via loose synchronization.

18. The computer program product of claim 13, wherein streaming tracks is accomplished via tight synchronization.

* * * * *